US009983784B2

(12) United States Patent
Shafi et al.

(10) Patent No.: US 9,983,784 B2
(45) Date of Patent: *May 29, 2018

(54) DYNAMIC GESTURE PARAMETERS

(71) Applicant: MICROSOFT TECHNOLOGY LICENSING, LLC, Redmond, WA (US)

(72) Inventors: Naji S. Shafi, Seattle, WA (US); Jesse G. Tobiason, Redmond, WA (US); Patrick Allan Gianelli, Sammamish, WA (US); Joseph J. Brychell, Kirkland, WA (US); Jeffery S. Welden, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/646,750

(22) Filed: Jul. 11, 2017

(65) Prior Publication Data

US 2017/0308287 A1    Oct. 26, 2017

Related U.S. Application Data

(63) Continuation of application No. 12/875,955, filed on Sep. 3, 2010, now Pat. No. 9,710,154.

(51) Int. Cl.
*G09G 5/00* (2006.01)
*G06F 3/0488* (2013.01)

(52) U.S. Cl.
CPC .............................. *G06F 3/04883* (2013.01)

(58) Field of Classification Search
USPC ................. 345/173, 156, 174, 168; 715/765
See application file for complete search history.

(56) References Cited

U.S. PATENT DOCUMENTS

| 7,450,113 B2 | 11/2008 | Gillespie et al. |
| 7,557,818 B1 | 7/2009 | Ubillos et al. |
| 7,614,019 B2 | 11/2009 | Rimas Ribikauskas et al. |
| 8,347,232 B1 | 1/2013 | Prud'Hommeaux et al. |
| 8,458,615 B2 | 6/2013 | Chaudhri |

(Continued)

FOREIGN PATENT DOCUMENTS

| CN | 1627915 A | 6/2005 |
| CN | 1694045 A | 11/2005 |
| CN | 101611373 A | 12/2009 |

OTHER PUBLICATIONS

"Enhancing Your Device Design Through Tactile Feedback", Retrieved from <<https:/ web.archive.org/web/20110515005426/ http:/ www.immersion.com/docs/Enhancing-Device-Design-Through-Tactile-Feedback.pdf>>, Apr. 2011, 7 Pages.

(Continued)

*Primary Examiner* — Thuy Pardo
(74) *Attorney, Agent, or Firm* — Workman Nydegger (57) ABSTRACT

Techniques involving gestures and other functionality are described. In one or more implementations, an input is recognized by a computing device as corresponding to a gesture, the gesture defined using a plurality of parameters, at least one of which having a threshold that varies with respect to another one of the parameters. An operation is caused to be performed by the computing device that corresponds to the gesture.

21 Claims, 6 Drawing Sheets

(56) References Cited

U.S. PATENT DOCUMENTS

| | | | |
|---|---|---|---|
| 8,539,375 | B1 | 9/2013 | Thorsander et al. |
| 9,019,201 | B2 | 4/2015 | Holmdahl et al. |
| 2005/0275638 | A1 | 12/2005 | Kolmykov-Zotov et al. |
| 2006/0177112 | A1 | 8/2006 | Yang et al. |
| 2007/0024595 | A1* | 2/2007 | Baker ............... G06F 3/03547 345/173 |
| 2007/0040813 | A1* | 2/2007 | Kushler ............... G06F 3/0237 345/173 |
| 2007/0277114 | A1 | 11/2007 | Mudge et al. |
| 2007/0291009 | A1 | 12/2007 | Wright et al. |
| 2008/0313538 | A1 | 12/2008 | Hudson |
| 2009/0273571 | A1 | 11/2009 | Bowens |
| 2009/0292989 | A1 | 11/2009 | Matthews et al. |
| 2009/0307631 | A1 | 12/2009 | Kim et al. |
| 2009/0327963 | A1 | 12/2009 | Mouilleseaux et al. |
| 2010/0081476 | A1 | 4/2010 | Markiewicz et al. |
| 2010/0241955 | A1 | 9/2010 | Price et al. |
| 2010/0281432 | A1 | 11/2010 | Geisner et al. |
| 2010/0306702 | A1 | 12/2010 | Warner |
| 2010/0306712 | A1 | 12/2010 | Snook et al. |
| 2011/0035666 | A1 | 2/2011 | Geisner et al. |
| 2011/0074699 | A1* | 3/2011 | Marr ............... G06F 3/0485 345/173 |
| 2011/0078597 | A1* | 3/2011 | Rapp ............... G06F 3/04845 715/765 |
| 2011/0181509 | A1 | 7/2011 | Rautiainen et al. |
| 2011/0209102 | A1 | 8/2011 | Hinckley et al. |
| 2011/0252350 | A1 | 10/2011 | Chaudhri |
| 2011/0316784 | A1* | 12/2011 | Bisutti ............... G06F 1/1626 345/168 |
| 2012/0110517 | A1 | 5/2012 | Sparks et al. |
| 2012/0110518 | A1 | 5/2012 | Chan et al. |
| 2012/0119987 | A1 | 5/2012 | Im et al. |
| 2012/0327009 | A1* | 12/2012 | Fleizach ............... G06F 3/04883 345/173 |
| 2013/0014053 | A1 | 1/2013 | Cabrera-Cordon et al. |
| 2013/0120279 | A1* | 5/2013 | Plichta ............... G06F 3/04883 345/173 |

OTHER PUBLICATIONS

"Microsoft Surface", Retrieved from <<https://msdn.microsoft.com/en-us/library/ee804902(v=surface.10).aspx>>, Retrieved on Jan. 7, 2009, 29 Pages.

"Using the Element Menu Control", Retrieved from <<http://msdn.microsoft.com/enus/library/ee804842(v=surface.10).aspx>>, Retrieved on Apr. 28, 2011, 4 Pages.

"Final Office Action Issued in U.S. Appl. No. 12/875,955", dated Apr. 25, 2014, 13 Pages.

"Final Office Action Issued in U.S. Appl. No. 12/875,955", dated Feb. 2, 2016, 11 Pages.

"Non Final Office Action Issued in U.S. Appl. No. 12/875,955", dated Dec. 23, 2014, 14 Pages.

"Non Final Office Action Issued in U.S. Appl. No. 12/875,955", dated Aug. 14, 2015, 11 Pages.

"Non Final Office Action Issued in U.S. Appl. No. 12/875,955", dated Nov. 27, 2013, 11 Pages.

"Notice of Allowance Issued in U.S. Appl. No. 12/875,955", dated Apr. 7, 2017, 8 Pages.

Parhi, et al., "Target Size Study for One-Handed Thumb Use on Small Touchscreen Devices", In Proceedings of the 8th Conference on Human-Computer Interaction with Mobile Devices and Services, Sep. 12, 2006, 8 Pages.

Joselli, et al., "gRmobile: A Framework for Touch and Accelerometer Gesture Recognition for Mobile Games", In Proceedings of the VIII Brazilian Symposium on Games and Digital Entertainment, Oct. 8, 2009, pp. 136-142.

"Final Office Action Issued in U.S. Appl. No. 13/178,193", dated Jan. 7, 2014, 13 Pages.

"Final Office Action Issued inU.S. Appl. No. 13/178,193", dated Jun. 23, 2014, 15 Pages.

"Non Final Office Action Issued in U.S. Appl. No. 13/178,193", dated Aug. 9, 2013, 9 Pages.

"Non Final Office Action Issued in U.S. Appl. No. 13/178,193", dated Feb. 13, 2014, 13 Pages.

"First Office Action and Search Report Issued in Chinese Patent Application No. 201110270791.6", dated Dec. 3, 2013, 12 Pages.

"Second Office Action and Search Report Issued in Chinese Patent Application No. 201110270791.6", dated Jun. 27, 2014, 13 Pages.

"Third Office Action Issued in Chinese Patent Application No. 201110270791.6", dated Dec. 31, 2014, 7 Pages.

Branscombe, Mary, "Surface Gets Simpler, Adds Win 7 Gestures", Retrieved from <<http://www.techradar.com/news/computing/surface-gets-simpler-adds-win-7-gestures-598488>>, May 13, 2009, 5 Pages.

"Fourth Office Action and Search Report Issued in Chinese Patent Application No. 201110270791.6", dated Jun. 30, 2015, 10 Pages.

"Notice of Allowance Issued in Chinese Patent Application No. 201110270791.6", dated Jan. 13, 2016, 4 Pages.

* cited by examiner

DYNAMIC GESTURE PARAMETERS

CROSS-REFERENCE TO RELATED APPLICATIONS

This application is a continuation of U.S. patent application Ser. No. 12/875,955 filed on Sep. 3, 2010, entitled "DYNAMIC GESTURE PARAMETERS," which issued as U.S. Pat. No. 9,710,154 on Jul. 18, 2017, and which application is expressly incorporated herein by reference in its entirety.

BACKGROUND

The amount of functionality that is available from computing devices is ever increasing, such as from mobile devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. One technique that was developed to add this issue involved gestures. Gestures may be utilized to initiate an operation using a variety of different techniques, such as movement of a finger across a display device to initiate a pan of a user interface. However, traditional gestures were defined using static parameters and thus limited the amount of gestures that may be recognized by the device, as well as complicated recognition of the gestures.

BRIEF SUMMARY

Techniques involving gestures and other functionality are described. In one or more implementations, an input is recognized by a computing device as corresponding to a gesture, the gesture defined using a plurality of parameters, at least one of which having a threshold that varies with respect to another one of the parameters. An operation is caused to be performed by the computing device that corresponds to the gesture.

In one or more implementations, an input is detected by a computing device. A determination is then made as to which of a plurality of gestures correspond to the input, one or more of the gestures defined using at least one parameter having a threshold that varies with respect to time.

In one or more implementations, one or more computer-readable media comprise instructions that are executable by a computing device to determine which of a plurality of gestures corresponds to an input detected using touchscreen functionality of the computing device, the determination based at least in part by a differentiation made between the plurality of gestures using at least one parameter that has a threshold that varies with respect to time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques that were used to access operations of a computing device may become less efficient when expanded to access an ever increasing number of operations. Gestures were developed as a technique that addressed these concerns such that users could readily initiate operations in an intuitive manner. However, gestures were traditionally defined using parameters having fixed thresholds, which limited the amount of gestures that could be recognized by a computing device as well as increased the difficulty to a user in specifying the different gestures.

Techniques involving dynamic gesture parameters are described. In examples, parameters that are used to define gestures may vary based on other parameters that are also used to define the gesture. In this way, a rich definition of a gesture may be utilized to increase the amount of gestures that may be recognized by a computing device, the accuracy in recognizing gestures, as well as increase the intuitiveness of the gestures to users of the computing device. A variety of different gestures may leverage the techniques described herein, such as touch gestures, gestures in a natural user interface that are detected using a camera, and so on. Further discussion of dynamic gesture parameters may be found in relation to the following sections.

In the following discussion, an example environment is first described that is operable to employ the gesture techniques described herein. Example illustrations of gestures and procedures involving the gestures are then described, which may be employed in the example environment as well as in other environments. Accordingly, the example environment is not limited to performing the example gestures and procedures. Likewise, the example procedures and gestures are not limited to implementation in the example environment.

Example Environment

Figure 1:
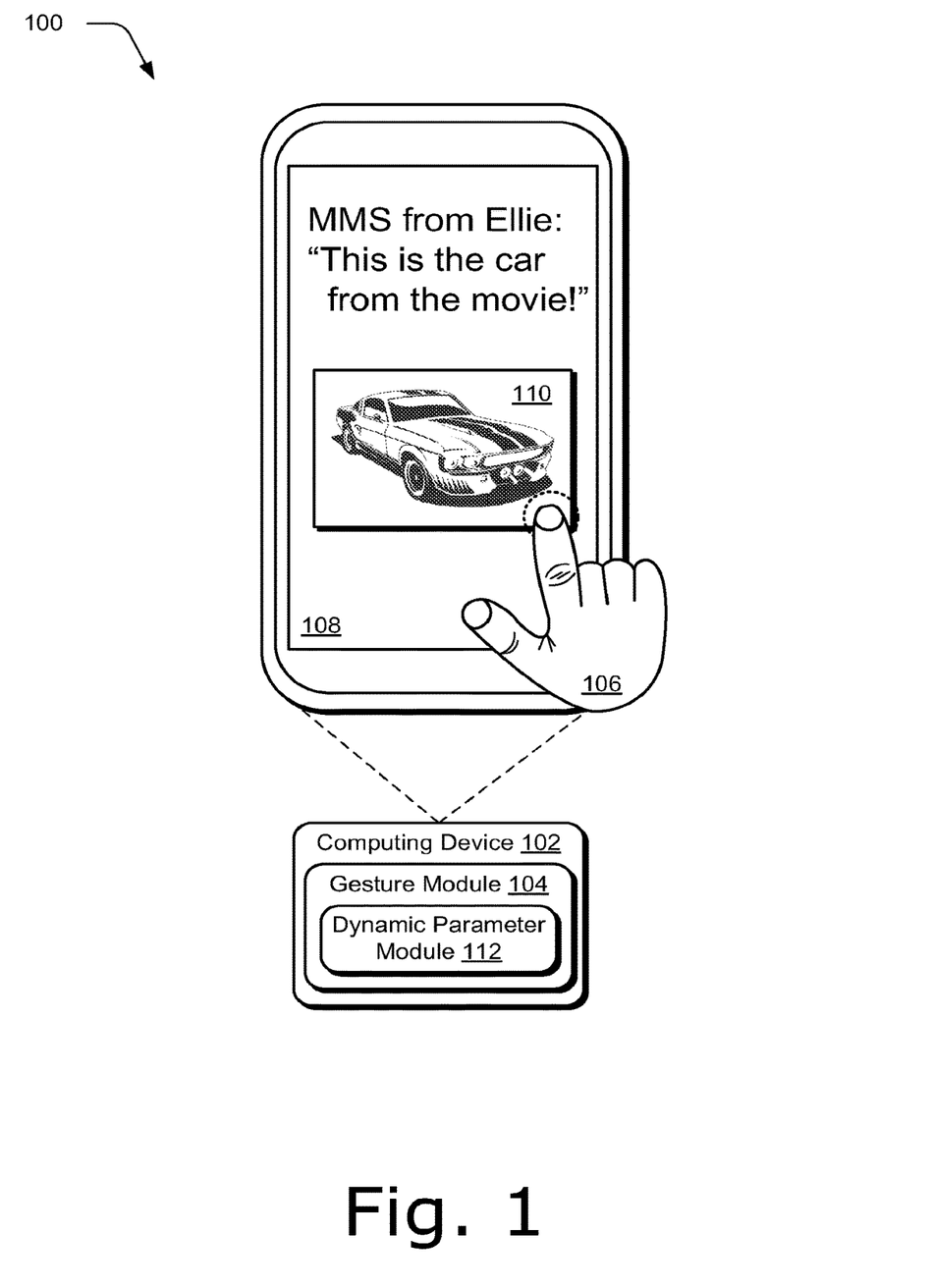
FIG. 1 is an illustration of an environment in an example implementation that is operable to employ dynamic gesture parameter techniques.

FIG. 1 is an illustration of an environment 100 in an example implementation that is operable to employ dynamic gesture parameter techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 3. Thus, the computing device 102 may range from a full resource device with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations, e.g., is executed on a processor of the computing device 102.

The computing device 102 is illustrated as including a gesture module 104. The gesture module 104 is representative of functionality to identify gestures and cause operations to be performed that correspond to the gestures. The gestures may be identified by the gesture module 104 in a variety of different ways. For example, the gesture module 104 may be configured to recognize a touch input, such as a finger of a user's hand 106 as proximal to a display device 108 of the computing device 102 using touchscreen functionality. A variety of other inputs may also be recognized, including a stylus input, an input involving movement of the computing device as a whole, an input detected using a camera, and so on.

The input may be recognized as including parameters (e.g., movement, selection point, etc.) that are usable to differentiate the input from other inputs recognized by the gesture module 104. This differentiation may then serve as a basis to identify a gesture from the inputs and consequently an operation that is to be performed based on identification of the gesture.

For example, a finger of the user's hand 106 is illustrated making a motion to select an image 110 displayed by the display device 108, such as through a "tap" of the finger of the user's hand 106 over the display of the image 110. Selection of the image 110 may be used for a variety of different purposes, such as to cause a larger display of the image, output of a menu having options to save or communicate the image 110 to another user, and so on.

However, a tap of the finger of the user's hand 106 may involve some movement against the display device 108. For instance, the finger of the user's hand 106 may slide across the display device 108 while making the motion, i.e., the "tap." Using traditional techniques, however, if the amount of movement was over a static threshold, the movement may be interpreted by the gesture module 104 as a "pan," such as to navigate to another screen in the user interface.

It has been observed that this movement may coincide with relatively quick motions made by the user's hand. In other words, a "quick" tap typically involves more movement across the display device 108 than a slower tap. Therefore, a user attempting to make such quick taps would oftentimes inadvertently initiate a pan gesture in the direction of the movement. Indeed, in some instances traditional computing devices have removed access to pan gestures in places in the user interface where quick tap gestures (e.g., sequential tapping) may be prevalent, such as display of a keyboard, keypad, and so on on the display device 108 that is configured to input text to the computing device 102.

The computing device 102 of FIG. 1, however, is illustrated as including a dynamic parameter module 112. The dynamic parameter module 112 is representative of functionality involving dynamic gesture parameters. In implementations, the dynamic parameter module 112 may adjust a threshold of a parameter in relation to another parameter to differentiate between gestures. Continuing with the previous example, the dynamic parameter module 112 may adjust a threshold for the parameter "distance" in relation to the parameter "time" to differentiate between pan and tap gestures. For instance, the threshold for distance may be set at 30 millimeters in order to initiate a pan gesture at less than 250 milliseconds. At over 250 milliseconds, the threshold for distance may be adjusted to 10 millimeters. In this way, the dynamic parameter module 112 may support rich definitions of gestures using a variety of different parameters, further discussion of which may be found in relation to the following figure.

Figure 2:
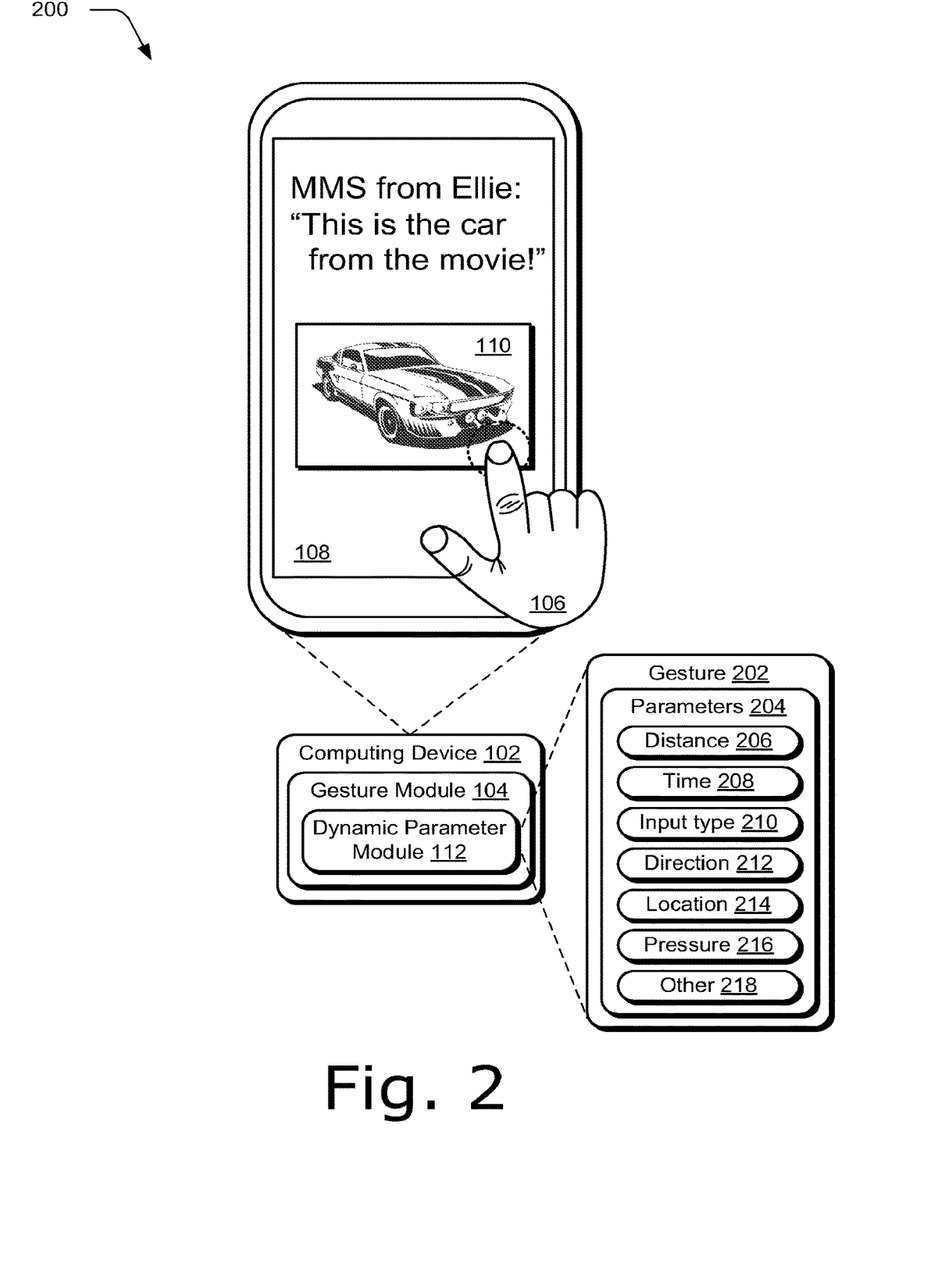
FIG. 2 illustrates an example system in which example parameters of gestures supported by a dynamic parameter module of FIG. 1 are shown.

FIG. 2 depicts a system 200 in an example implementation in which example parameters of gestures supported by the dynamic parameter module 112 of FIG. 1 are shown. Serial/Sequential tasks typically involve multiple movements in relation to the display device of the computing device 102, e.g., multiple "taps," "drags," and so on. For example, typing on a keyboard or dialing a phone number that is displayed on the display device 108 may involve multiple taps in quick succession to specify desired letters, numbers, symbols, and so forth. Typically, a distance threshold is defined to set a distance at which a finger of the user's hand 106 can move before it is interpreted as a pan gesture instead of a tap gesture. For example, on a "finger down," the finger of the user's hand 106 may roll ten millimeters before it is interpreted as a pan.

However, quick movements made in relation to the computing device 102 (e.g., quick taps of the user's finger 106) may involve a greater amount of movement as previously described. Although a variety of traditional techniques have been employed to correct for this problem, these solutions have caused their own problems, e.g., changing the threshold upward to the point that the pan gesture is difficult to initiate, trigger the tap gesture on "finger down" which would remove use of the pan gesture altogether, and so on.

In implementations, the dynamic parameter module 112 may support definitions of a gesture 202 using parameters 204 that have thresholds that may change with respect to values of other parameters 204. For example, distance 206 may change with respect to time 208 to differentiate between tap and pan gestures, such that at a value of zero seconds for the time 208 parameter 204, the threshold for the distance 206 parameter may be set at thirty millimeters whereas at 250 milliseconds, the threshold for the distance 206 parameter may drop to ten millimeters. A variety of different relationships may be supported by the parameters 204 defined for a gesture 202, such as linear, exponential, and so on. For instance, the distance threshold for a tap gesture may change based in a linear fashion.

Although the dynamic parameter module 112 has been described as being used to adjust a distance 206 parameter in relation to a time 208 parameter, a variety of other parameters may also employ thresholds that are dynamically adjusted in relation to each other. For example, the dynamic parameter module 112 may also support parameters that describe input types (e.g., touch, stylus, body positioning in a natural user interface), direction 212 of the input, location 214 of the input (e.g., on the display device 108), pressure 216 (e.g., applied against the display device 108 in providing the input), and other 218 inputs, such as jitter, velocity (calculated using time and distance), area, force, and so on.

Thus, the threshold of the gesture 202 may be defined using a variety of statistics, such as a minimum, maximum, average, deviation, rate of change, and so on. Additionally, tracking of these statistics may support a variety of different gestures, such as tracking of distances, velocities, and accelerations between multiple fingers of the user's hand 108. Accordingly, a variety of different parameters 204 may be employed having thresholds that are variable based on values of other parameters. Further, the use of the dynamic thresholds supported by the dynamic parameter module 112 may serve as a basis to support a variety of different gestures, such as "finger up," "finger down," "taps," "pans," "press & hold," "flick," "double tap," "multi-finger" gestures, and so on.

Additionally, jitter may also be addressed by the dynamic parameter module 112. Jitter is a threshold that is used to filter out "bouncing" of a touch point, which is shown using a phantom circle around a point of a finger of the user's hand 106 on the image 110. Jitter is often encountered due to hardware characteristics of the computing device 102 even though a finger is stationary. For example, consider a cursor placement scenario where the user performs a "tap & hold" to drag a cursor between text. A user typically holds their finger for a brief period of time before lifting their finger once they have placed the cursor properly. While lifting their finger up, however, the user's finger might move or the hardware characteristics might cause the touch point on "finger up" to jump significantly. This may result in the cursor switching to a different location than the user had desired. In this case, the dynamic parameter module 112 may set a jitter threshold to be higher when the finger of the user's hand 106 has been held stationary for a predefined amount of time, e.g., 0.7 seconds.

In some implementations, multiple gestures may become a match simultaneously. Accordingly, filtering may be employed to help choose which of the gestures is likely intended by a user that performed the gesture. A variety of different techniques may be used, such as a simple heuristic such as a fixed gesture precedence, or it may take many contextual inputs into account to make the decision. For example, filtering heuristics based on context may include saving finger movement patterns of a current user and performing search using these patterns of usage based on closeness of the match and match frequencies. Heuristics may also employ a history of previous gestures that were accepted by the user. For example, if the previous gesture was a pan gesture and the finger has not "come up," then it is unlikely that the current gesture would then be a tap gesture but rather another pan or flick gesture.

Although the discussion may describe specific examples of touch inputs, in instances the types of inputs may be switched (e.g., touch may be used to replace a NUI input) and even removed (e.g., both inputs may be provided using touch or via a NUI device) without departing from the spirit and scope thereof. Further, although in instances in the following discussion the gestures are illustrated as being input using touchscreen functionality, the gestures may be input using a variety of different techniques by a variety of different devices, further discussion of which may be found in relation to the following figure.

Figure 3:
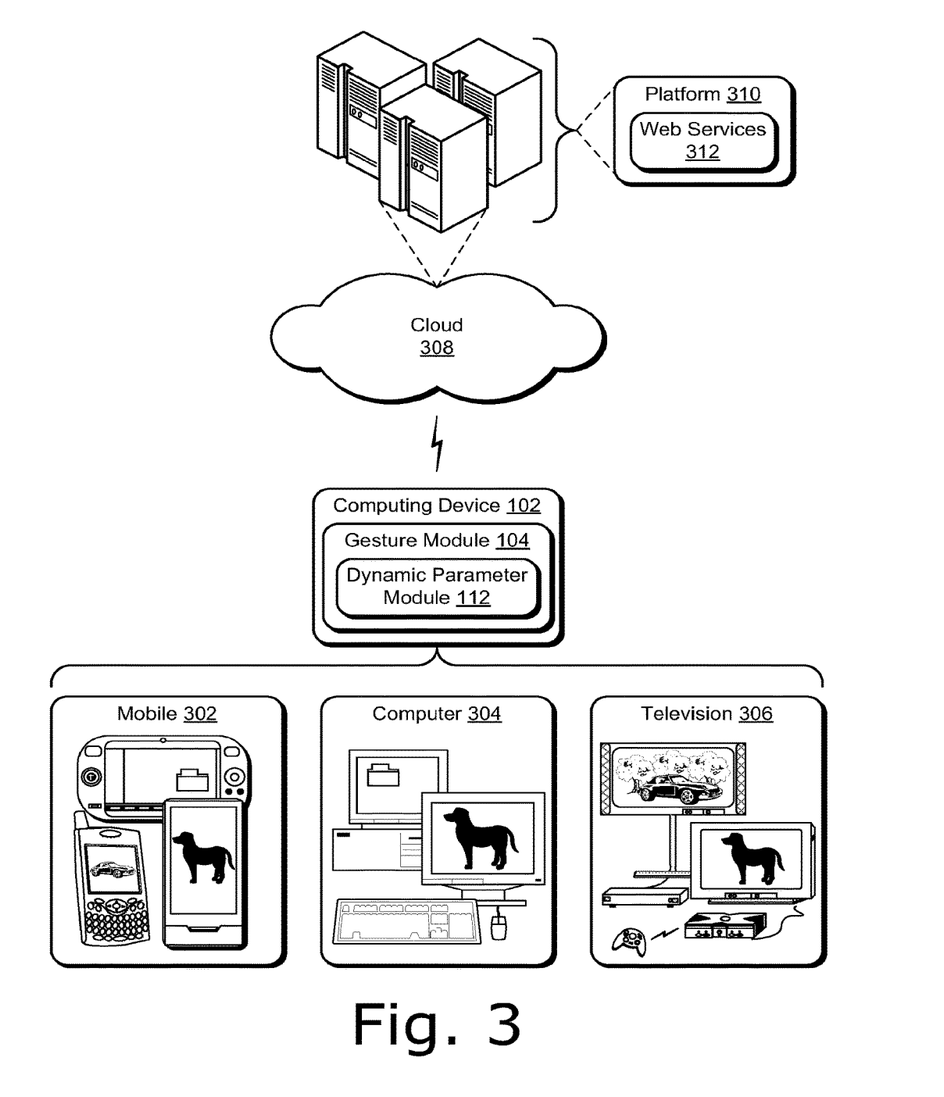
FIG. 3 illustrates an example system showing a gesture module and dynamic parameter module of FIG. 1 as being implemented using an environment where multiple devices are interconnected through a central computing device.

FIG. 3 illustrates an example system 300 showing the gesture module 104 and dynamic parameter module 112 of FIG. 1 as being implemented using in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means. In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices.

For example, as previously described the computing device 102 may assume a variety of different configurations, such as for mobile 302, computer 304, and television 306 uses. Each of these configurations has a generally corresponding screen size and thus the computing device 102 may be configured accordingly to one or more of these device classes in this example system 300. For instance, the computing device 102 may assume the mobile 302 class of device which includes mobile phones, portable music players, game devices, and so on. The computing device 102 may also assume a computer 304 class of device that includes personal computers, laptop computers, netbooks, and so on. The television 306 configuration includes configurations of devices that involve display on a generally larger screen in a casual environment, e.g., televisions, set-top boxes, game consoles, and so on. Thus, the techniques described herein may be supported by these various configurations of the computing device 102 and are not limited to the specific examples described in the following sections.

The cloud 308 is illustrated as including a platform 310 for web services 312. The platform 310 abstracts underlying functionality of hardware (e.g., servers) and software resources of the cloud 308 and thus may act as a "cloud operating system." For example, the platform 310 may abstract resources to connect the computing device 102 with other computing devices. The platform 310 may also serve to abstract scaling of resources to provide a corresponding level of scale to encountered demand for the web services 312 that are implemented via the platform 310. A variety of other examples are also contemplated, such as load balancing of servers in a server farm, protection against malicious parties (e.g., spam, viruses, and other malware), and so on. Thus, web services 312 and other functionality may be supported without the functionality "having to know" the particulars of the supporting hardware, software, and network resources.

Accordingly, in an interconnected device embodiment, implementation of functionality of the gesture module 104 (and the dynamic parameter module 112) may be distributed throughout the system 300. For example, the gesture module 104 may be implemented in part on the computing device 102 as well as via the platform 310 that abstracts the functionality of the cloud 308.

Further, the functionality may be supported by the computing device 102 regardless of the configuration. For example, the gesture techniques supported by the gesture module 104 may be detected using touchscreen functionality in the mobile 302 configuration, track pad functionality of the computer 304 configuration, detected by a camera as part of support of a natural user interface (NUI) that does not involve contact with a specific input device in the television 306 example, and so on. Further, performance of the operations to detect and recognize the inputs to identify a particular gesture may be distributed throughout the system 300, such as by the computing device 102 and/or the web services 312 supported by the platform 310 of the cloud 308. Further discussion of the gestures supported by the gesture module 104 may be found in relation to the following procedures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Example Procedures

The following discussion describes techniques for dynamic gesture parameters that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1 and systems 200, 300 of FIGS. 2 and 3, respectively.

Figure 4:
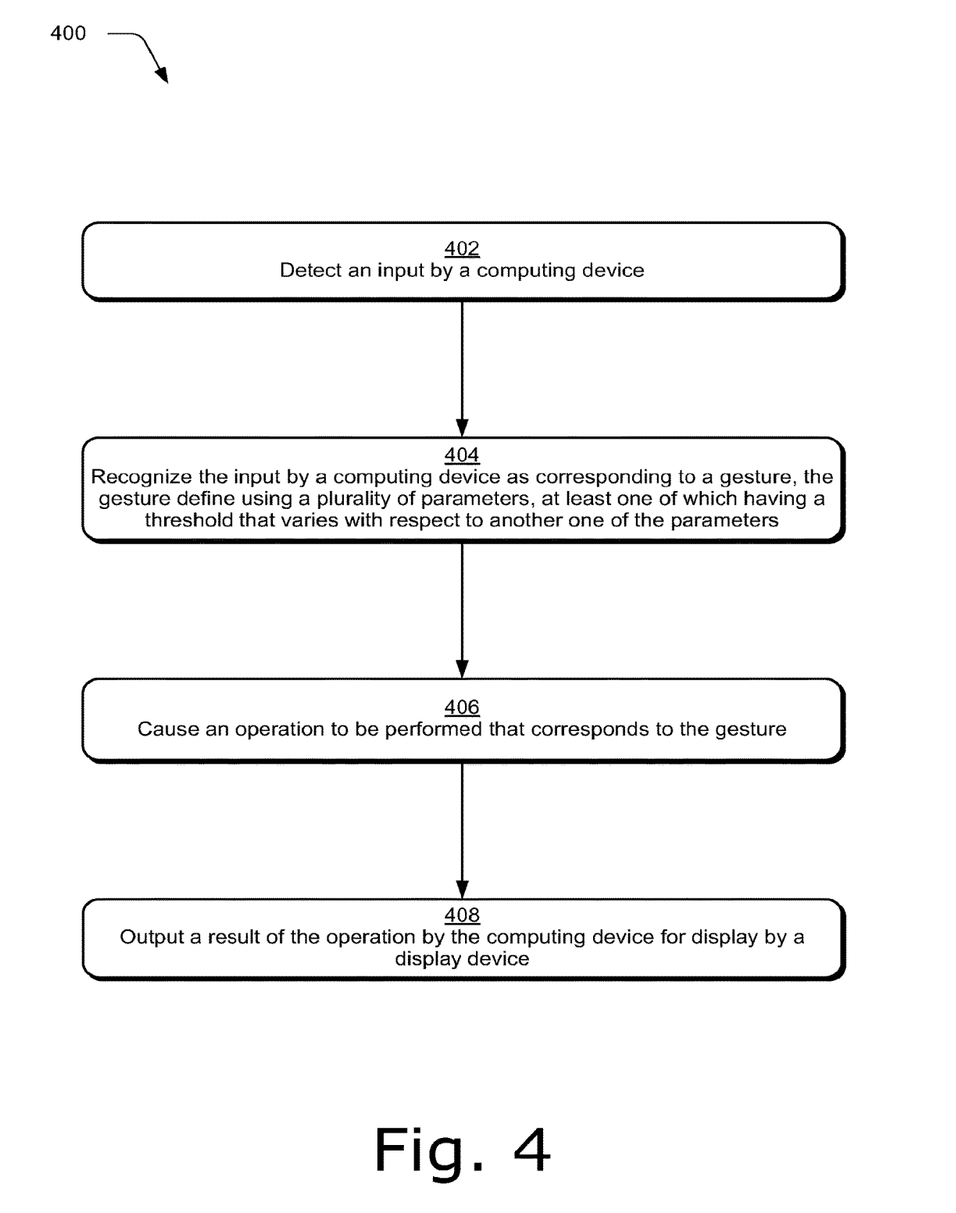
FIG. 4 is a flow diagram that depicts a procedure in an example implementation in which a gesture is recognized that is defined using at least one parameter having a threshold that varies with respect to another parameter.

FIG. 4 is a flow diagram that depicts a procedure 400 in an example implementation in which a gesture is recognized that is defined using at least one parameter having a threshold that varies with respect to another parameter. An input is detected by a computing device (block 402). For example, the computing device 102 may detect the input using touchscreen functionality, a camera for use in a natural user interface, one or more motion sensors, and so forth.

The input is recognized by the computing device as corresponding to a gesture, the gesture defined using a plurality of parameters, at least one of which having a threshold that varies with respect to another one of the parameters (block 404). As described in relation to FIG. 2, for instance, a gesture 202 may be described using a variety of different parameters 204, such as distance 206, time 208, input type 210, direction 212, location 214, pressure 216 and other 218 parameters, such as jitter as previously described.

One or more of these parameters 204 may employ a threshold that varies with respect of values of other parameters. For instance, amount of pressure 216 utilized to initiate a selection may vary with respect location 214 such that different parts of the user interface involve different amounts of pressure to make a selection. Thus, this use of dynamic thresholds may support rich definitions of gestures that may be readily initiated by a user.

An operation is then caused to be performed that corresponds to the gesture (block 406). The dynamic parameter module 112, for instance, upon identification of a tap gesture in conjunction with an icon may initiate execution of an application that corresponds to the icon, may cause a user interface to pan in response to a pan gesture, and so on.

Thus, a result of the operation may be output by the computing device for display by a display device (block 408) or other result, e.g., tactile feedback and so on.

Figure 5:
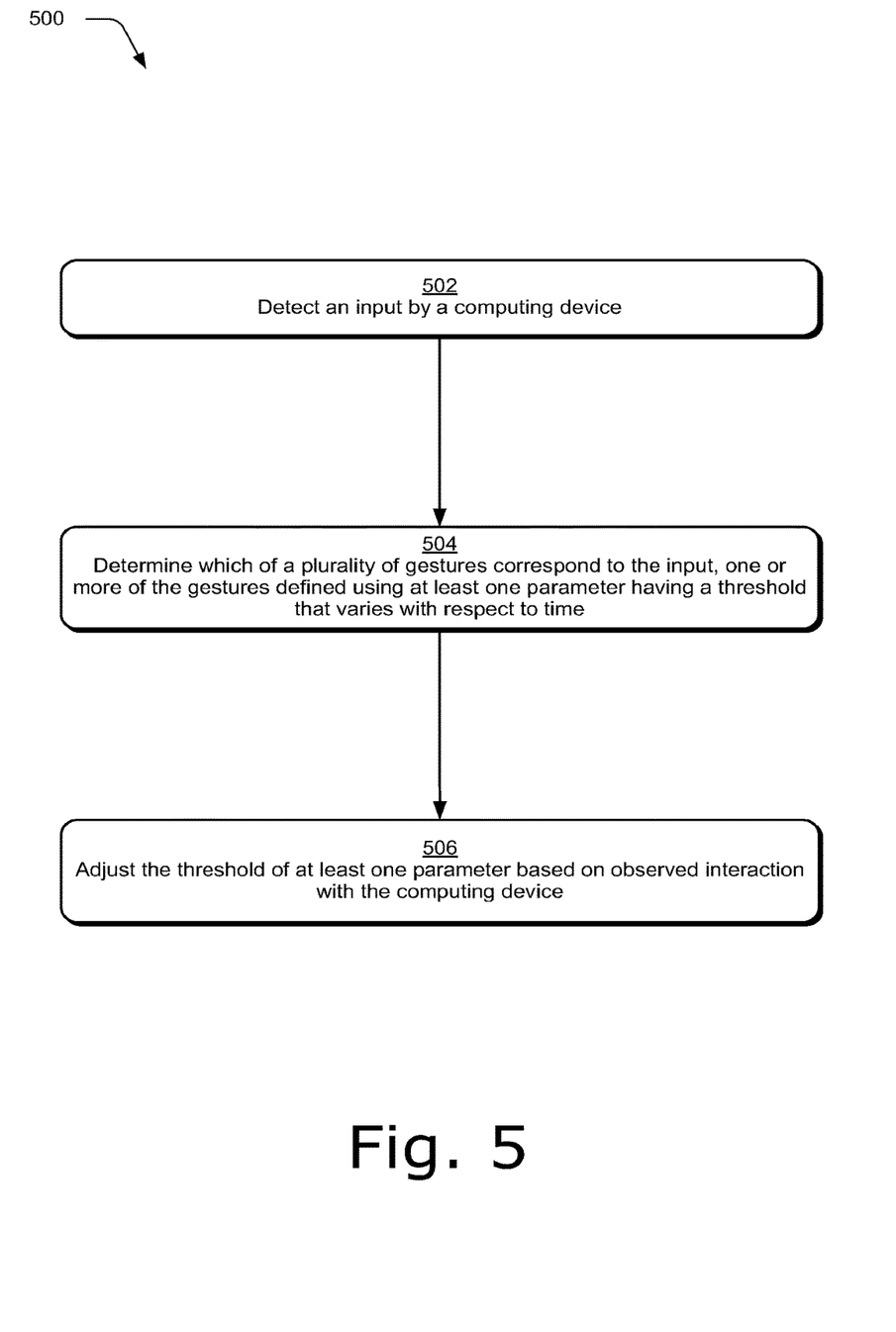
FIG. 5 is a flow diagram that depicts a procedure in an example implementation in which a gesture is recognized that is defined using at least one parameter having a threshold that varies with respect to time.

FIG. 5 is a flow diagram that depicts a procedure 500 in an example implementation in which a gesture is recognized that is defined using at least one parameter having a threshold that varies with respect to time. As before, an input is detected by a computing device (block 502).

A determination is then made as to which of a plurality of gestures correspond to the input, one or more of the gesture defined using at least one parameter having a threshold that varies with respect to time (block 504). For example, the dynamic parameter module 112 may determine that the input occurred in less than 250 milliseconds and involved less than 30 millimeters of distance and therefore a tap gesture is to be initiated. In another instance, the input may continue over 250 milliseconds and over 10 millimeters and therefore a pan gesture is intended. A variety of other examples are also contemplated.

Additionally, a threshold of at least one parameter may be adjusted based on observed interaction with the computing device (block 506). For example, the dynamic parameter module 112 may monitor user interaction with the computing device 102. The module may then determine which gestures are intended to correspond to particular motions made by a user, such as by monitoring corrections made by a user when an unintended gesture is initiated. Thresholds of the gestures may then be adjusted automatically and without user intervention by the dynamic parameter module 112 to describe the monitored interaction. In this way, the dynamic parameter module 112 may adjust definitions of gestures to correspond to observed interaction. A variety of other heuristic approached may also be leveraged without departing from the spirit and scope thereof.

Example Device

Figure 6:
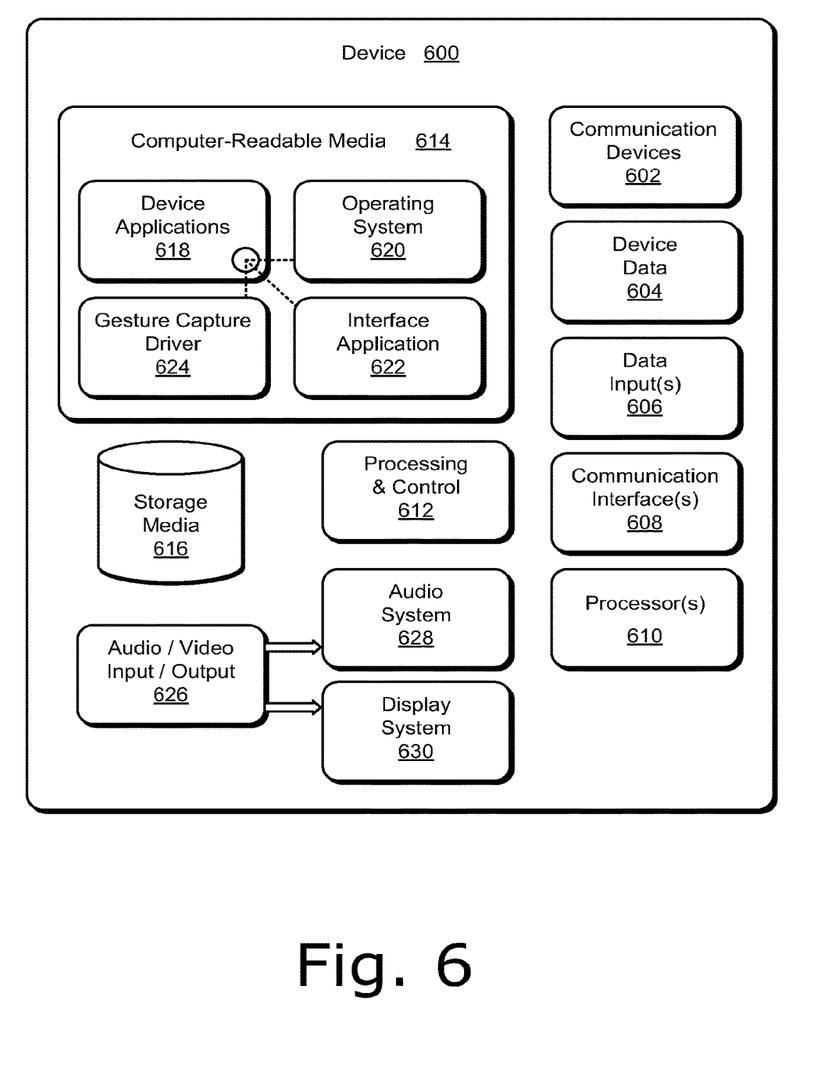
FIG. 6 illustrates various components of an example device that can be implemented as any type of portable and/or computer device as described with reference to FIGS. 1-3 to implement embodiments of the gesture techniques described herein.

FIG. 6 illustrates various components of an example device 600 that can be implemented as any type of portable and/or computer device as described with reference to FIGS. 1 and 2 to implement embodiments of the gesture techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and a gesture-capture driver 624 that are shown as software modules and/or computer applications. The gesture-capture driver 624 is representative of software that is used to provide an interface with a device configured to capture a gesture, such as a touchscreen, track pad, camera, and so on. Alternatively or in addition, the interface application 622 and the gesture-capture driver 624 can be implemented as hardware, software, firmware, or any combination thereof. Additionally, the gesture-capture driver 624 may be configured to support multiple input devices, such as separate devices to capture touch and stylus inputs, respectively. For example, the device may be configured to include dual display devices, in which one of the display device is configured to capture touch inputs while the other stylus inputs.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   detecting, by the computing device, an input comprising a plurality of parameters;
   determining which gesture of a plurality of gestures the input corresponds to based at least in part on the plurality of parameters, wherein the plurality of gestures include at least a first gesture defined by either distance or pressure with a first threshold that varies as a function of a second threshold of time, such that the first threshold automatically increases when the second threshold increases and the first threshold automatically decreases when the second threshold decreases;
   causing an operation to be performed that corresponds to the determined gesture; and
   adjusting at least the first threshold or the second threshold in response to observed interactions, including the input, with the computing device.

2. The method as described in claim 1, wherein the input is a touch input detected using touchscreen functionality of the computing device.

3. The method as described in claim 1, further comprising detecting the input using a camera.

4. The method as described in claim 1, further comprising outputting a result of the operation by the computing device for display by a display device.

5. The method as described in claim 1, wherein the first and second thresholds are set to filter jitter from a touch point, and wherein the adjusting includes automatically increasing the first threshold to be higher in response to detecting an increase in the second threshold comprising a period of time in which a user finger remains stationary.

6. The method of claim 1, wherein the plurality of gestures include a pan gesture and wherein the first gesture is a tap gesture.

7. The method of claim 1, wherein the second threshold varies as an exponential function of the first parameter.

8. The method of claim 1, wherein the second threshold varies as a linear function of the first parameter.

9. A computing device comprising:
   a touch sensitive display;
   one or more processors; and
   one or more storage media having stored computer-executable instructions for implementing a method for managing gesture thresholds, the method comprising:
   detecting, by the computing device, an input at the touch sensitive display comprising a plurality of parameters;
   determining which gesture of a plurality of gestures the input corresponds to based at least in part on the plurality of parameters, wherein the plurality of gestures include at least a first gesture defined by either distance or pressure with a first threshold that varies as a function of a second threshold of time, such that the first threshold automatically increases when the second threshold increases and the first threshold automatically decreases when the second threshold decreases;

causing an operation to be performed that corresponds to the determined gesture; and adjusting at least the first threshold or the second threshold in response to observed interactions, including the input, with the computing device.

10. The computing device as described in claim 9, the method further comprising detecting the input using a camera.

11. The computing device as described in claim 9, the method further comprising outputting a result of the operation by the computing device for display by a display device.

12. The computing device as described in claim 9, wherein the first and second thresholds are set to filter jitter from a touch point, and wherein the adjusting includes increasing the first threshold to be higher in response to detecting an increase in the second threshold comprising a period of time in which a user finger remains stationary.

13. The computing device as described in claim 9, wherein the plurality of gestures include a pan gesture and wherein the first gesture is a tap gesture.

14. The computing device as described in claim 9, wherein the second threshold varies as an exponential function of the first parameter.

15. The computing device as described in claim 9, wherein the second threshold varies as a linear function of the first parameter.

16. One or more computer-readable memories comprising instructions that are executable by a computing device to implement a method for managing gesture parameters, the method including:

detecting, by the computing device, an input at a touch sensitive display of the computing device, the input comprising a plurality of parameters;

determining which gesture of a plurality of gestures the input corresponds to based at least in part on the plurality of parameters, wherein the plurality of gestures include at least a first gesture defined by either distance or pressure with a first threshold that varies as a function of a second threshold of time, such that the first threshold automatically increases when the second threshold increases and the first threshold automatically decreases when the second threshold decreases;

causing an operation to be performed that corresponds to the determined gesture; and adjusting at least the first threshold or the second threshold in response to observed interactions, including the input, with the computing device.

17. The computing device as described in claim 16, wherein the input is a touch input detected using touchscreen functionality of the computing device.

18. The computing device as described in claim 16, the method further comprising detecting the input using a camera.

19. The computing device as described in claim 16, wherein the first and second thresholds are set to filter jitter from a touch point, and wherein the adjusting includes increasing the first threshold to be higher in response to detecting an increase in the second threshold comprising a period of time in which a user finger remains stationary.

20. The method of claim 1, wherein adjusting at least the first threshold or the second threshold occurs in response to observed user-corrective interactions including monitoring gesture corrections made by a user when an unintended gesture is initiated.

21. The computing device as described in claim 9, wherein the input is a touch input detected using touchscreen functionality of the computing device.

* * * * *